United States Patent
Shin et al.

(10) Patent No.: US 11,721,810 B2
(45) Date of Patent: Aug. 8, 2023

(54) ELECTRODE FOR LITHIUM SECONDARY BATTERY AND LITHIUM SECONDARY BATTERY INCLUDING THE SAME

(71) Applicant: LG Chem, Ltd., Seoul (KR)

(72) Inventors: Won Kyung Shin, Daejeon (KR); Kyoung Ho Ahn, Daejeon (KR); Chul Haeng Lee, Daejeon (KR); Jung Hoon Lee, Daejeon (KR)

(73) Assignee: LG Energy Solution, Ltd.

( * ) Notice: Subject to any disclaimer, the term of this patent is extended or adjusted under 35 U.S.C. 154(b) by 265 days.

(21) Appl. No.: 16/768,352

(22) PCT Filed: Mar. 25, 2019

(86) PCT No.: PCT/KR2019/003461
§ 371 (c)(1),
(2) Date: May 29, 2020

(87) PCT Pub. No.: WO2019/194445
PCT Pub. Date: Oct. 10, 2019

(65) Prior Publication Data
US 2020/0365905 A1    Nov. 19, 2020

(30) Foreign Application Priority Data

Apr. 4, 2018 (KR) .................. 10-2018-0039365

(51) Int. Cl.
| | |
|---|---|
| *H01M 10/0565* | (2010.01) |
| *H01M 4/64* | (2006.01) |
| *H01M 4/62* | (2006.01) |
| *H01M 10/0525* | (2010.01) |
| *H01M 4/13* | (2010.01) |
| *H01M 4/02* | (2006.01) |
| *H01M 10/0562* | (2010.01) |

(52) U.S. Cl.
CPC ............... *H01M 4/64* (2013.01); *H01M 4/13* (2013.01); *H01M 4/621* (2013.01); *H01M 4/622* (2013.01); *H01M 4/623* (2013.01); *H01M 10/0525* (2013.01); *H01M 10/0565* (2013.01); *H01M 10/0562* (2013.01); *H01M 2004/021* (2013.01); *H01M 2004/027* (2013.01); *H01M 2004/028* (2013.01); *H01M 2300/0082* (2013.01)

(58) Field of Classification Search
CPC ........ H01M 4/13; H01M 4/621; H01M 4/622; H01M 4/623; H01M 2004/023; H01M 10/0525; H01M 10/0562; H01M 10/0564; H01M 10/0565

See application file for complete search history.

(56) References Cited

U.S. PATENT DOCUMENTS

| | | | | |
|---|---|---|---|---|
| 4,792,504 A | * | 12/1988 | Schwab | ................ H01M 6/181 429/312 |
| 10,243,239 B1 | | 3/2019 | Ahn et al. | |
| 2001/0044045 A1 | * | 11/2001 | Sato | .................... H01M 4/0409 429/231.95 |
| 2014/0147738 A1 | * | 5/2014 | Chen | ....................... H01M 4/38 429/188 |
| 2015/0372305 A1 | | 12/2015 | Matsuo et al. | |
| 2016/0181617 A1 | | 6/2016 | Aoyama et al. | |
| 2017/0187024 A1 | * | 6/2017 | Kim | .................... H01M 50/446 |
| 2017/0229735 A1 | * | 8/2017 | Ahn | .................. H01M 10/0567 |
| 2018/0019471 A1 | * | 1/2018 | Wu | ........................ H01M 4/133 |
| 2018/0034101 A1 | | 2/2018 | Lee et al. | |
| 2018/0212219 A1 | | 7/2018 | Kim et al. | |
| 2021/0147604 A1 | * | 5/2021 | Daigle | ................. H01M 50/417 |

FOREIGN PATENT DOCUMENTS

| | | |
|---|---|---|
| CN | 104871352 A | 8/2015 |
| CN | 105518914 A | 4/2016 |
| CN | 106797048 A | 5/2017 |
| CN | 107251305 A | 10/2017 |
| CN | 107623103 A | 1/2018 |
| JP | H09087571 A | 3/1997 |
| JP | 2002158037 A | 5/2002 |
| JP | 2003268053 A | 9/2003 |
| JP | 2015072901 A | 4/2015 |
| KR | 20040020633 A | 3/2004 |
| KR | 20060042326 A | 5/2006 |
| KR | 100858795 B1 | 9/2008 |
| KR | 20150110530 A | 10/2015 |
| KR | 20150131513 A | 11/2015 |
| KR | 20160040128 A | 4/2016 |
| KR | 101683202 B1 | 12/2016 |
| WO | 2006052082 A1 | 5/2006 |
| WO | WO-2016203390 A1 * | 12/2016 |
| WO | 2017039109 A1 | 3/2017 |

OTHER PUBLICATIONS

International Search Report for PCT/KR2019/003461 dated Jul. 3, 2019; 2 pages.
Extended European Search Report including Written Opinion for Application No. EP19780793 dated Jan. 14, 2021, pp. 1-10.
Examination Report from the Office Action for Indian Application No. 202017024119 dated Mar. 11, 2022, 1 page.

* cited by examiner

*Primary Examiner* — Jeremiah R Smith
(74) *Attorney, Agent, or Firm* — Lerner David LLP

(57) ABSTRACT

The present invention relates to an electrode for a lithium secondary battery, which includes an electrode current collector and an electrode active material layer which is formed on one surface of the electrode current collector and includes an electrode active material and an organic binder containing an ethylenically unsaturated group, and a lithium secondary battery including the same.

12 Claims, 2 Drawing Sheets

ELECTRODE FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2019/003461 filed Mar. 25, 2019, which claims priority from Korean Patent Application No. 10-2018-0039365 filed Apr. 4, 2018, all of which are incorporated herein by reference.

TECHNICAL FIELD

The present invention relates to an electrode for a lithium secondary battery and a lithium secondary battery including the same, and more particularly, to an electrode suitable for a lithium secondary battery using a gel polymer electrolyte and a lithium secondary battery including the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Also, recently, in line with growing concerns about environmental issues, a significant amount of research into electric vehicles (EVs) and hybrid electric vehicles (HEVs), which may replace vehicles using fossil fuels, such as gasoline vehicle and diesel vehicle, one of major causes of air pollution, has been conducted.

Nickel-metal hydride (Ni-MH) secondary batteries or lithium secondary batteries having high energy density, high discharge voltage, and output stability have been used as power sources of the electric vehicles (EVs) and hybrid electric vehicles (HEVs), wherein, in a case in which the lithium secondary batteries are used in the electric vehicles, since the lithium secondary batteries must be used for more than 10 years under harsh conditions in addition to high energy density and ability to provide high output in a short period of time, energy density, safety, and long-term life characteristics, which are significant better than those of a conventional small-sized lithium secondary battery, are inevitably required.

In general, a lithium secondary battery is prepared by using a negative electrode, a positive electrode, a separator disposed between them, and an electrolyte as a transfer medium of lithium ions, wherein an electrolyte in a liquid state, particularly, an ionic conductive organic liquid electrolyte, in which a salt is dissolved in a non-aqueous organic solvent, has been mainly used in a conventional secondary battery.

However, when the electrolyte in a liquid state is used as described above, the possibilities of degrading an electrode material and volatilizing the organic solvent are not only high, but also there is a problem in safety, for example, combustion caused by increases in ambient temperature and temperature of the battery itself. In particular, the lithium secondary battery has limitations in that, since gas is generated in the battery due to the decomposition of a carbonate organic solvent and/or a side reaction between the organic solvent and an electrode during charge and discharge, a thickness of the battery increases. Thus, degradation of performance and safety of the battery essentially occurs.

In general, it is known that battery safety improves in the order of a liquid electrolyte, a gel polymer electrolyte, and a solid polymer electrolyte, but battery performance decreases in the same order. Currently, it is known that the solid polymer electrolyte has not been commercialized yet due to poor battery performance.

In contrast, since the gel polymer electrolyte has excellent electrochemical stability, the thickness of the battery may not only be constantly maintained, but a contact between the electrode and the electrolyte may also be excellent due to the inherent adhesion of a gel phase, and thus, a thin-film type battery may be prepared. Thus, gel polymer electrolytes are widely used in recent years.

Since a conventional electrode for a secondary battery has weak adhesion to the gel polymer electrolyte, there is a limitation in that the gel polymer electrolyte may not be uniformly disposed on an interface of the electrode when the conventional electrode is directly applied to the secondary battery using the gel polymer electrolyte. Specifically, if the gel polymer electrolyte is agglomerated on a portion of a surface of the electrode depending on the adhesion between the electrode for a secondary battery and the gel polymer electrolyte, mobility of lithium ions may be reduced to cause an increase in resistance in the battery.

Therefore, there is a need to develop an electrode for a secondary battery which may improve safety and capacity characteristics of the battery and may suppress an increase in interfacial resistance between the electrode and the gel polymer electrolyte by allowing the gel polymer electrolyte to be uniformly and closely attached to the surface of the electrode for a secondary battery by improving the adhesion to the gel polymer electrolyte.

(Patent Document 1) Korean Patent Application Laid-open Publication No. 10-2015-0131513

DISCLOSURE OF THE INVENTION

Technical Problem

An aspect of the present invention provides an electrode for a lithium secondary battery, which may improve performance and safety of the battery by improving adhesion to a gel polymer electrolyte, and a lithium secondary battery including the same.

Technical Solution

According to an aspect of the present invention, there is provided an electrode for a lithium secondary battery which includes an electrode current collector; and an electrode active material layer which is formed on one surface of the electrode current collector and includes an electrode active material and an organic binder containing an ethylenically unsaturated group.

In this case, the ethylenically unsaturated group may include at least one selected from the group consisting of a vinyl group, an acryloxy group, and a methacryloxy group.

According to another aspect of the present invention, there is provided a lithium secondary battery including the electrode for a lithium secondary battery and a gel polymer electrolyte including a polymer network in which oligomers containing a (meth)acrylate group are bonded in a three-dimensional structure.

Advantageous Effects

Since an electrode for a lithium secondary battery according to the present invention includes an organic binder containing an ethylenically unsaturated group in an electrode active material layer, the organic binder and an oligomer included in a gel polymer electrolyte composition may be bonded to each other through a radical polymerization reaction during curing to improve adhesion between the electrode and the gel polymer electrolyte.

Since the electrolyte may be uniformly formed on an electrode interface when the adhesion between the electrode and the electrolyte is improved as described above, an increase in internal resistance of the battery may be suppressed to improve performance and safety of the battery.

MODE FOR CARRYING OUT THE INVENTION

Figure 1:
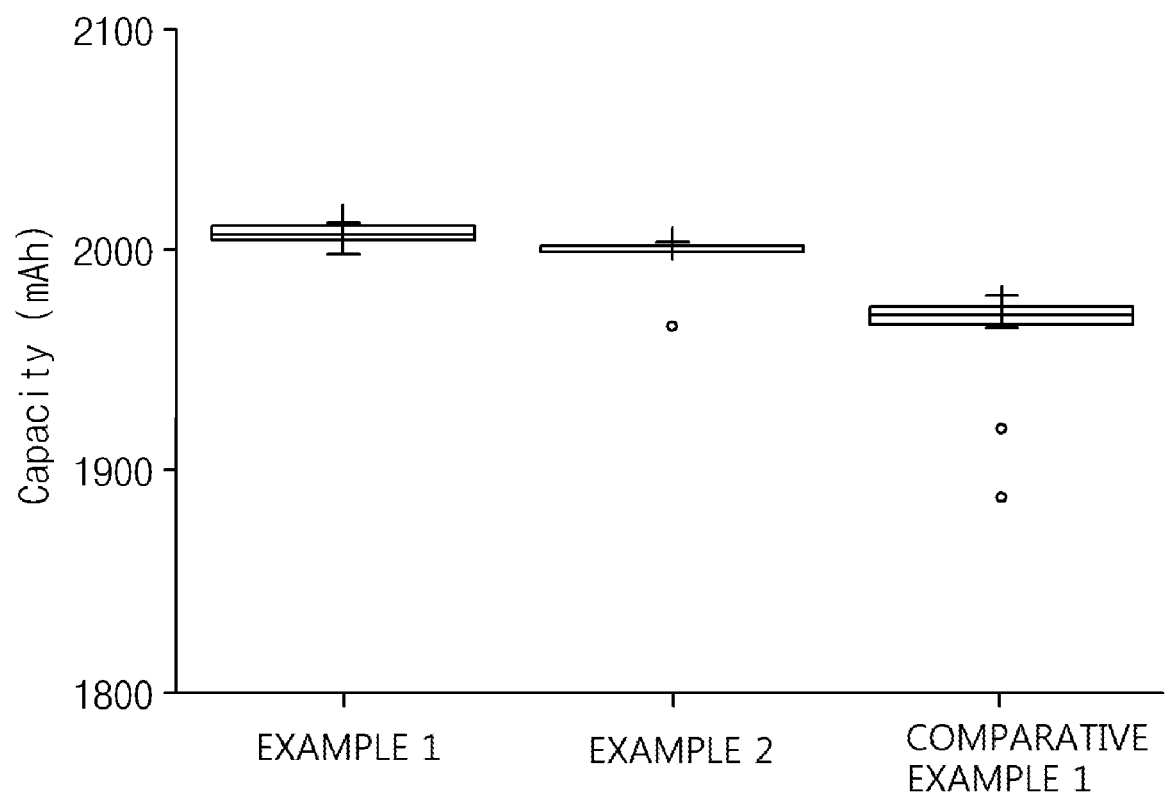
FIG. 1 is a graph illustrating initial capacities of lithium secondary batteries measured according to Experimental Example 1.

Hereinafter, the present invention will be described in detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Unless otherwise specified in the present invention, the expression "*" denotes the same or different atom or a portion connected between ends of a formula.

<Electrode for Lithium Secondary Battery>

An electrode for a lithium secondary battery according to the present invention includes an electrode current collector and an electrode active material layer which is formed on one surface of the electrode current collector and includes an electrode active material and an organic binder containing an ethylenically unsaturated group. The electrode for a lithium secondary battery according to an embodiment of the present invention may be used as both a positive electrode and a negative electrode for a secondary battery.

First, a case where the electrode for a lithium secondary battery according to the present invention is a positive electrode will be described. In the case that the electrode for a lithium secondary battery is a positive electrode, the electrode includes a positive electrode collector and a positive electrode active material layer formed on one surface of the positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may have fine surface roughness to improve bonding strength with the electrode active material layer, may be used in various shapes such as a film, a sheet, a foil, a net, a porous body, a foam body, a non-woven fabric body, and the like, and may have a thickness of 3 μm to 500 μm.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where $0<Y1<1$) $LiMn_{2-Z1}Ni_{Z1}O_4$ (where $0<Z1<2$) etc.), lithium-nickel-cobalt-based oxide (e.g., $LiNi_{1-Y2}Co_{Y2}O_2$ (where $0<Y2<1$), lithium-manganese-cobalt-based oxide (e.g., $LiCo_{1-Y3}Mn_{Y3}O_2$ (where $0<Y3<1$) $LiMn_{2-Z2}Co_{Z2}O_4$ (where $0<Z2<2$) etc.), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$) or $Li(Ni_{p2}Co_{q2}Mn_{r2})O_4$ (where $0<p2<2$, $0<q2<2$, $0<r2<2$, and $p2+q2+r2=2$), etc.), or lithium-nickel-cobalt-transition metal (M) oxide (e.g., $Li(Ni_{p3}Co_{q3}Mn_{r3}M_{S1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein $0<p3<1$, $0<q3<1$, $0<r3<1$, $0<S1<1$, and $p3+q3+r3+S1=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., Li ($Ni_{0.6}Mn_{0.2}Co_{0.2}$) $O_2$, Li ($Ni_{0.5}Mn_{0.3}Co_{0.2}$) $O_2$, or Li ($Ni_{0.8}Mn_{0.1}Co_{0.1}$) $O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.3}Co_{0.1})O_2$, and any one thereof or a mixture of two or more thereof may be used.

The positive electrode active material may be included in an amount of 65 parts by weight to 99 parts by weight, preferably 75 parts by weight to 99 parts by weight, and more preferably 85 parts by weight to 99 parts by weight based on 100 parts by weight of the positive electrode active material layer.

The organic binder included in the positive electrode active material layer contains an ethylenically unsaturated group. The organic binder containing the ethylenically unsaturated group may be radically polymerized with an oligomer included in a composition for a gel polymer electrolyte.

When an active material layer of an electrode for a conventional secondary battery is formed, a binder is used to prevent exfoliation of an active material. However, since the conventional binder does not have a functional group that reacts with a gel polymer electrolyte, the conventional binder may not improve adhesion between the gel polymer electrolyte and the electrode. In a case in which the adhesion between the gel polymer electrolyte and the electrode is weak, since a gel polymer is difficult to be uniformly formed on a surface of the electrode, there is a limitation in that internal resistance of the battery is increased and safety of the battery is reduced.

Thus, in order to address the limitation, the organic binder containing the ethylenically unsaturated group has been used in the active material layer of the electrode for a lithium secondary battery of the present invention. In a case in which the organic binder contains the ethylenically unsaturated group, while the oligomer included in the composition for a gel polymer electrolyte is cured to form a gel polymer, the organic binder included in the electrode active material layer also undergoes a radical polymerization reaction to form a polymer network together. In this case, since the adhesion is improved as the organic binder included in the electrode active material layer is connected to the gel polymer electrolyte, a binding force between the electrode and the gel polymer electrolyte is increased and the gel polymer electrolyte is uniformly formed at an interface of the electrode, and thus, an increase in interfacial resistance may be suppressed. Also, even if an external shock is applied, a short-circuit phenomenon in the battery may be controlled.

For example, the ethylenically unsaturated group may include at least one selected from the group consisting of a vinyl group, an acryloxy group, and a methacryloxy group.

The organic binder may further include a unit containing at least one selected from the group consisting of an alkylene group having 1 to 5 carbon atoms which is substituted with at least one halogen element (fluorine (F), chlorine (Cl), bromine (Br), and iodine (I)), an alkylene oxide group having 1 to 5 carbon atoms, an alkylene oxide group having 1 to 5 carbon atoms which is substituted with at least one halogen element (F, Cl, Br, and I), an imide group, and celluloid, in addition to the above functional group.

In this case, the ethylenically unsaturated group may be substituted into main chain and/or side chain composed of the above units, and the number or position of the attached functional groups is not specified.

For example, the unit containing the alkylene group having 1 to 5 carbon atoms which is substituted with at least one halogen element may be represented by at least one selected from units represented by Formulae X-1 and X-2 below.

[Formula X-1]

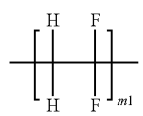

In Formula X-1, m1 is an integer of 10 to 10,000, preferably 20 to 8,000, and more preferably 50 to 6,000.

[Formula X-2]

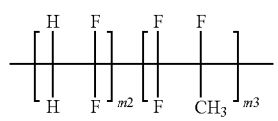

In Formula X-2, m2 and m3 are each independently an integer of 10 to 10,000, preferably 20 to 8,000, and more preferably 50 to 6,000.

For example, the unit containing the alkylene oxide group may be represented by Formula X-3 below.

[Formula X-3]

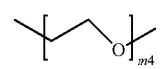

In Formula X-3, m4 is an integer of 10 to 10,000, preferably 20 to 8,000, and more preferably 50 to 6,000.

For example, the unit containing the alkylene oxide group substituted with a halogen element may be represented by Formula X-4 below.

[Formula X-4]

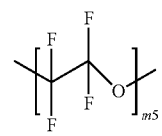

In Formula X-4, m5 is an integer of 10 to 10,000, preferably 20 to 8,000, and more preferably 50 to 6,000.

For example, the unit containing the imide group may be represented by Formula X-5 below.

[Formula X-5]

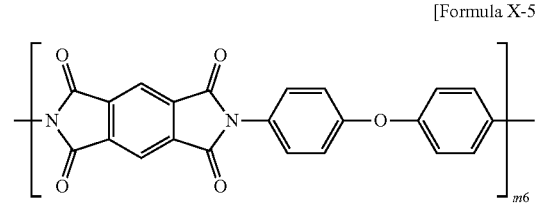

In Formula X-5, m6 is an integer of 1 to 50,000, preferably 5 to 35,000, and more preferably 50 to 20,000.

For example, the unit containing the celluloid may be represented by Formula X-6 below.

[Formula X-6]

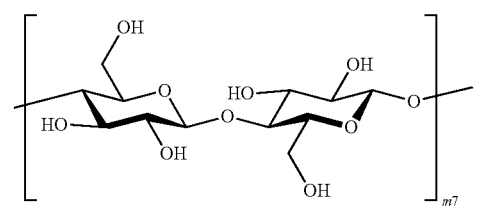

In Formula X-6, m7 is an integer of 10 to 10,000, preferably 20 to 8,000, and more preferably 50 to 6,000.

Specifically, the compound used as the organic binder is a compound in which the ethylenically unsaturated group is substituted into polymer main chain and/or side chain containing at least one unit selected from the group consisting of Formulae X-1 to X-6.

The polymer or copolymer of the present invention as described above, for example, may be prepared by a method in which a functional group containing a halogen atom, a hydroxyl group, an alkyloxide group, and alkyl group are attached by performing end-capping at the end of the polymerization reaction, but the present invention is not limited thereto. Specifically, the functional group containing a halogen element is substituted into the polymer by using a halogenated compound, such as sodium chloride (NaCl), as an end-capping agent, and, in this case, a (meth)acrylate compound or a vinyl compound may be reacted to prepare an organic binder containing an ethylenically unsaturated group such as a (meth)acryloxy group or a vinyl group.

The organic binder may be included in an amount of 0.5 part by weight to 20 parts by weight, preferably 0.5 part by weight to 15 parts by weight, and more preferably 0.5 part by weight to 10 parts by weight based on 100 parts by weight of the positive electrode active material layer. In a case in which the organic binder is included in an amount within the above range, the exfoliation of the positive electrode active material included in the positive electrode active material layer may be prevented, and an electrode for a lithium secondary battery having improved adhesion to the gel polymer electrolyte may be provided.

The positive electrode active material layer may further include a conductive material and a binder that does not contain an ethylenically unsaturated group, in addition to the above components.

The binder that does not contain an ethylenically unsaturated group is a component that assists in the binding between the electrode active material and the conductive agent and in the binding with the current collector. Specifically, the binder may include polyvinylidene fluoride (PVDF), polyvinyl alcohol, carboxymethylcellulose (CMC), starch, hydroxypropyl cellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluoro rubber, various copolymers, and the like.

The conductive agent is a component for further improving the conductivity of the positive electrode active material. Any conductive agent may be used without particular limitation so long as it has suitable conductivity without causing adverse chemical changes in the battery, and, for example, a conductive material, such as: graphite; a carbon-based material such as carbon black, acetylene black, Ketjen black, channel black, furnace black, lamp black, or thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercially available conductive agent may be acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon). The conductive agent may be included in an amount of 0.5 part by weight to 15 parts by weight, preferably 0.5 part by weight to 10 parts by weight, and more preferably 0.5 part by weight to 5 parts by weight based on 100 parts by weight of the positive electrode active material layer.

In order to form the positive electrode active material layer, it is common to first prepare a composition for a positive electrode active material by mixing the above components with a solvent, and then coating the composition on the current collector. In this case, the solvent used may include an organic solvent, such as N-methyl-2-pyrrolidone (NMP), and the solvent may be used in an amount such that desirable viscosity of the composition for a positive electrode active material is obtained. For example, the solvent may be used in an amount such that an amount of solid content in the composition for a positive electrode active material is in a range of 5 wt % to 70 wt %, preferably 10 wt % to 60 wt %, and more preferably 15 wt % to 50 wt %.

Next, the negative electrode, for example, includes a negative electrode active material layer including a negative electrode active material, a binder, a conductive agent, and a solvent on a negative electrode collector.

The negative electrode collector generally has a thickness of 3 µm to 500 µm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

With respect to the negative electrode, the negative electrode active material may include at least one negative electrode active material selected from the group consisting of natural graphite, artificial graphite, a carbonaceous material; lithium-containing titanium composite oxide (LTO); metals (Me) such as silicon (Si), tin (Sn), lithium (Li), zinc (Zn), magnesium (Mg), cadmium (Cd), cerium (Ce), nickel (Ni), or iron (Fe); alloys composed of the metals (Me); oxides ($MeO_x$) of the metals (Me); and composites of the metals (Me) and carbon. In a case in which the electrode for a lithium secondary battery of the present invention is only used as the positive electrode, a separate negative electrode active material layer is not formed, and the current collector may only be used as the negative electrode.

An organic binder of the negative electrode also includes an ethylenically unsaturated group, and the ethylenically unsaturated group may include at least one selected from the group consisting of a vinyl group, an acryloxy group, and a methacryloxy group.

Specifically, the organic binder is compound in which the functional group is substituted into main chain and/or side chain of polyvinylidene fluoride (PVDF), polyvinyl alcohol, carboxymethylcellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, or various copolymers thereof.

The negative electrode may further include a conventional binder in addition to the organic binder containing the ethylenically unsaturated group. As a specific example, polyvinylidene fluoride (PVDF), polyvinyl alcohol, carboxymethylcellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, or various copolymers thereof, in which the ethylenically unsaturated group is not included, may be used as the binder.

In addition, since the binder other than the organic binder containing the ethylenically unsaturated group, the conductive agent, and the solvent are the same as those described above, detailed descriptions thereof will be omitted.

<Lithium Secondary Battery>

Next, a lithium secondary battery according to the present invention will be described. The lithium secondary battery according to another embodiment of the present invention includes the electrode for a lithium secondary battery and a gel polymer electrolyte including a polymer network in which oligomers containing a (meth)acrylate group are bonded in a three-dimensional structure.

Specifically, the lithium secondary battery includes a positive electrode, a negative electrode, a separator disposed between the positive electrode and the negative electrode, and a gel polymer electrolyte disposed between the positive electrode, the negative electrode, and the separator. In this case, since the positive electrode and the negative electrode are the same as those described above, detailed descriptions thereof will be omitted.

As the separator insulating the electrodes between the positive electrode and the negative electrode, both a conventionally known polyolefin-based separator and a composite separator having an organic-inorganic composite layer formed on an olefin-based substrate may be used, but the present invention is not limited thereto.

The gel polymer electrolyte includes a polymer network in which oligomers containing a (meth)acrylate group are bonded in a three-dimensional structure. The oligomers containing a (meth)acrylate group may be bonded in a three-dimensional structure by radical polymerization with the organic binder included in the electrode active material layer as well as between the oligomers.

For example, the oligomer may further include an oxyalkylene group. Specifically, the oligomer may be represented by Formula 1 below.

$$A\text{-}C_1\text{-}A' \qquad \text{[Formula 1]}$$

In Formula 1, A and A' are each independently a unit containing at least one (meth)acrylate group, and $C_1$ is a unit containing an oxyalkylene group.

Specifically, units A and A' are each independently a unit containing at least one (meth)acrylate group so that the oligomers may be bonded in a three-dimensional structure to form a polymer network. Units A and A' may be derived from monomers containing monofunctional or multifunctional (meth)acrylate or (meth)acrylic acid.

For example, units A and A' may each independently include at least one selected from units represented by Formulae A-1 to A-5 below.

[Formula A-1]

[Formula A-2]

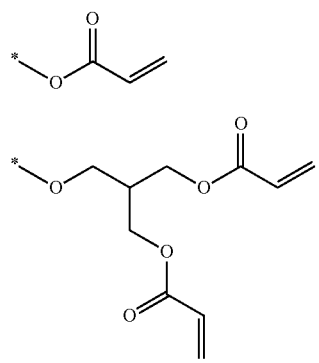

[Formula A-3]

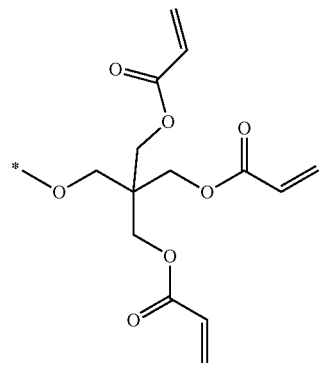

[Formula A-4]

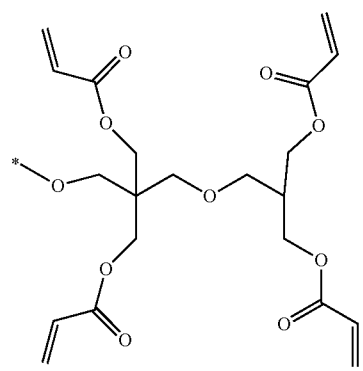

[Formula A-5]

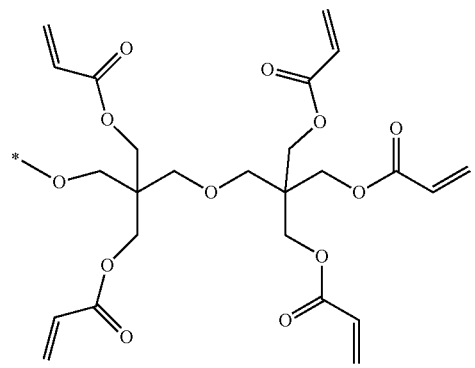

Unit $C_1$ may include a unit represented by Formula $C_1$-1.

$$*\!-\!(\!R\!-\!O\!)_{k1}\!-\!O\!-\!* \qquad \text{[Formula } C_1\text{-1]}$$

In Formula $C_1$-1, R is a substituted or unsubstituted linear or branched alkylene group having 1 to 10 carbon atoms, and k1 is an integer of 1 to 10,000, preferably 1 to 9,000, and more preferably 1 to 8,000.

As another example, in Formula $C_1$-1,

R may each independently be —$CH_2CH_2$- or —$CHCH_3CH_2$-.

For example, according to an embodiment of the present invention, the oligomer forming the polymer network may be at least one compound selected from the group consisting of Formulae 1-1 to 1-5 below.

[Formula 1-1]
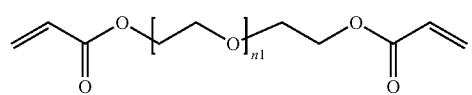
n1 in Formula 1-1 is 1 to 10,000,
[Formula 1-2]
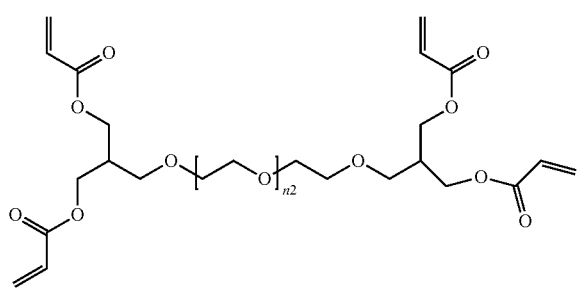
n2 in Formula 1-2 is 1 to 10,000,
[Formula 1-3]
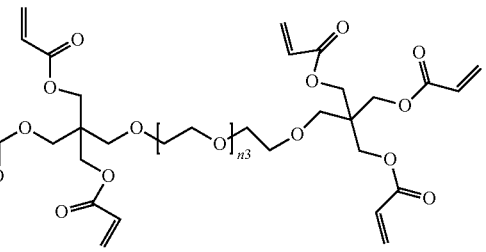
n3 in Formula 1-3 is 1 to 10,000,
[Formula 1-4]
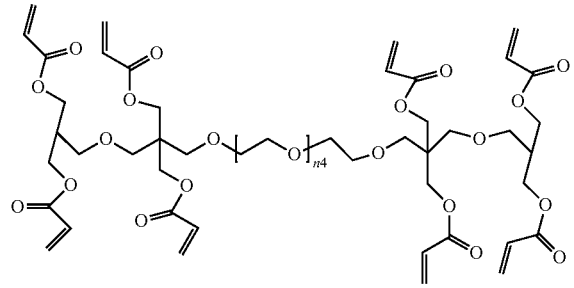
n4 in Formula 1-4 is 1 to 10,000, and
[Formula 1-5]
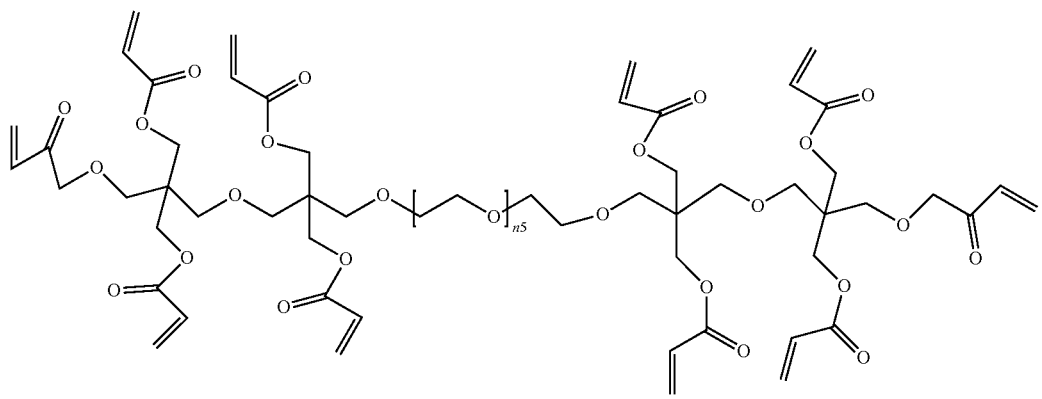
n5 in Formula 1-5 is 1 to 10,000.

In Formulae 1-1 to 1-5, n1 to n5 are each independently an integer of 1 to 10,000, preferably 1 to 9,000, and more preferably 1 to 8,000.

It is desirable that the gel polymer electrolyte is formed by curing after injecting a composition for a gel polymer electrolyte including the oligomer into a battery case.

Specifically, the secondary battery according to the present invention may be prepared by (a) inserting an electrode assembly composed of a positive electrode, a negative electrode, and a separator disposed between the positive electrode and the negative electrode into a battery case, and (b) injecting the composition for a gel polymer electrolyte according to the present invention into the battery case and polymerizing the composition to form a gel polymer electrolyte.

In this case, the polymerization reaction may be performed by using thermal polymerization, E-beam, γ-ray, and room temperature/high temperature aging processes.

Also, as the battery case, various battery cases used in the art may be used without limitation, and, for example, a cylindrical type, prismatic type, pouch type, or coin type battery case may be used.

The composition for a gel polymer electrolyte may include a lithium salt, a non-aqueous organic solvent, and a polymerization initiator in addition to the oligomer.

Any lithium salt typically used in an electrolyte for a lithium secondary battery may be used as the lithium salt without limitation. For example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $CH_3CO_2^-$, $SCN^-$, and $(CF_3CF_2SO_2)_2N^-$ as an anion. One or, if necessary, a mixture of two or more thereof may be used as the lithium salt. The lithium salt may be appropriately changed in a normally usable range, but may be included in a concentration of 0.8 M to 2 M, for example, 0.8 M to 1.5 M in the electrolyte solution to obtain an optimum effect of forming an anti-corrosion film on the surface of the electrode. However, the concentration is not necessarily limited to the above range, but the lithium salt may be included at a high concentration of 2M or more depending on other components in the composition for a gel polymer electrolyte.

Any non-aqueous organic solvent typically used in an electrolyte solution for a lithium secondary battery may be used as the non-aqueous organic solvent without limitation. For example, an ether compound, an ester compound, an amide compound, a linear carbonate compound, or a cyclic carbonate compound may be used alone or as a mixture of two or more thereof. Among them, the non-aqueous organic solvent may typically include the cyclic carbonate compound, the linear carbonate compound, or a mixture thereof.

Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. Also, specific examples of the linear carbonate compound may be any one selected from the group consisting of dimethyl carbonate (DMC), diethyl carbonate (DEC), dipropyl carbonate (DPC), ethylmethyl carbonate (EMC), methylpropyl carbonate, and ethylpropyl carbonate, or a mixture of two or more thereof, but the present invention is not limited thereto.

In particular, cyclic carbonates, such as ethylene carbonate and propylene carbonate, which are known to well dissociate the lithium salt in the electrolyte due to high permittivity as highly viscous organic solvents, among the carbonate-based organic solvents may be used, and an electrolyte solution having high electrical conductivity may be prepared when the cyclic carbonate is mixed with low viscosity, low permittivity linear carbonate, such as dimethyl carbonate and diethyl carbonate, in an appropriate ratio.

Also, as the ether compound among the non-aqueous organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

As the ester compound among the non-aqueous organic solvents, any one selected from the group consisting of linear esters such as methyl acetate, ethyl acetate, propyl acetate, methyl propionate, ethyl propionate, propyl propionate, and butyl propionate; and cyclic esters such as γ-butyrolactone, γ-valerolactone, γ-caprolactone, σ-valerolactone, and ε-caprolactone, or a mixture of two or more thereof may be used, but the present invention is not limited thereto.

The polymerization initiator is a compound which forms a radical by being decomposed by heat in the battery, for a non-limiting example, at a temperature of 30° C. to 100° C., for example, 60° C. to 80° C., or by being decomposed at room temperature (5° C. to 30° C.). In this case, the formed radical may initiate a free radical reaction with a functional group, such as the (meth)acrylate group in the oligomer, to form a polymer network by the polymerization between the oligomers. Since curing by bonding between the oligomers proceeds as the polymer network is formed, a gel polymer electrolyte may be formed.

A conventional polymerization initiator known in the art may be used as the polymerization initiator, and the polymerization initiator may include at least one selected from the group consisting of an azo-based compound, a peroxide-based compound, and a mixture thereof.

For example, the polymerization initiator may include organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and at least one azo-based compound selected from the group consisting of 2,2'-azobis (2-cyanobutane), dimethyl 2,2'-azobis(2-methylpropionate), 2,2'-azobis(methylbutyronitrile), 2,2'-azobis(iso-butyronitrile) (AIBN), and 2,2'-azobisdimethyl-valeronitrile (AMVN), but the present invention is not limited thereto.

The polymerization initiator may be included in an amount of 0.1 wt % to 5 wt % based on a total weight of the oligomer. If the amount of the polymerization initiator included is within the above range, the residual unreacted polymerization initiator may be minimized, and a predetermined level or higher of gelation may be achieved.

According to another embodiment of the present invention, a battery module including the lithium secondary battery as a unit cell and a battery pack including the battery module are provided. Since the battery module and the battery pack include the lithium secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, the present invention will be described in more detail, according to specific examples. However, the following examples are merely presented to exemplify the present invention, and the scope of the present invention is not limited thereto. It will be apparent to those skilled in the art that various modifications and alterations are possible within the scope and technical spirit of the present invention, and such modifications and alterations fall within the scope of claims included herein.

EXAMPLES

1. Example 1

(1) Organic Binder Preparation

Vinylidene fluoride (VDF) as a monomer, diisopropyl peroxydicarbonate as a free radical initiator, and 1,1,2-trichlorotrifluoroethane, as a solvent, were added to a reactor cooled to −15° C. under a nitrogen atmosphere.

Thereafter, a polymerization reaction was performed so as to polymerize a compound (weight-average molecular weight: 50,000), in which the unit represented by Formula X-1 was repeated, by stirring the reactants at 200 rpm while maintaining the temperature at 45° C. for polymerization initiation. Thereafter, after 10 hours, NaCl was added to substitute Cl into a terminal of the polymerized compound to terminate the polymerization reaction, and a monomer not participating in the polymerization reaction was discharged.

After dispersing the polymerized compound in an N-methylpyrrole solvent, acrylic acid was added to the polymerized compound at a molar ratio of 1:1.1 and the mixture was stirred at 200 rpm while maintaining the temperature at 45° C. in the presence of NaOH. Thereafter, after 10 hours, a drying process was performed at 120° C. to obtain an organic binder in which the Cl at the terminal was substituted with an acryloxy group.

(2) Preparation of Electrode for Lithium Secondary Battery

1) Positive Electrode Preparation 97 wt % of Li (Ni$_{0.8}$Mn$_{0.1}$Co$_{0.1}$) O$_2$ as a positive electrode active material, 1 wt % of carbon black as a conductive agent, and 2 wt % of the above-prepared organic binder were added to N-methyl-2-pyrrolidone (NMP), as a solvent, to prepare a positive electrode active material layer composition. An about 20 μm thick aluminum (Al) thin film, as a positive electrode collector, was coated with the positive electrode active material layer composition and dried, and the coated Al thin film was then roll-pressed to prepare a positive electrode.

2) Negative Electrode Preparation 95 wt % of carbon powder as a negative electrode active material, 1 wt % of carboxymethylcellulose (CMC) and 3 wt % of a styrene butadiene rubber (SBR), as a binder, and 1 wt % of carbon black, as a conductive agent, were added to NMP, as a solvent, to prepare a negative electrode active material layer composition. A 10 μm thick copper (Cu) thin film, as a negative electrode collector, was coated with the negative electrode active material layer composition and dried, and the coated Cu thin film was then roll-pressed to prepare a negative electrode.

(3) Gel Polymer Electrolyte Composition Preparation

A gel polymer electrolyte composition was prepared by adding 5 g of the compound represented by Formula 1-1 (n1=3) and 0.01 g of dimethyl 2,2'-azobis(2-methylpropionate) (CAS No. 2589-57-3), as a polymerization initiator, to 94.99 g of an organic solvent in which 1 M LiPF6 was dissolved in ethylene carbonate (EC) : ethyl methyl carbonate (EMC) (=3:7 (volume ratio)).

(4) Lithium Secondary Battery Preparation

After an electrode assembly was prepared by sequentially stacking the above-prepared positive electrode, negative electrode, and a separator formed of three layers of polypropylene/polyethylene/polypropylene (PP/PE/PP), the electrode assembly was accommodated in a battery case, the composition for a gel polymer electrolyte was injected thereinto, and the battery case was stored at room temperature for 2 days and was then heated (thermal polymerization) at 65° C. for 5 hours to prepare a lithium secondary battery.

2. Example 2

A mixture, in which vinylidene fluoride (VDF) and hexafluoropropylene (HFP) were mixed in a weight ratio of 7:3, as a monomer, diisopropyl peroxydicarbonate as a free radical initiator, and 1,1,2-trichlorotrifluoroethane, as a solvent, were added to a reactor cooled to −15° C. under a nitrogen atmosphere. Thereafter, a polymerization reaction was performed so as to polymerize a compound (weight-average molecular weight: 100,000), in which the unit represented by Formula X-2 was repeated, by stirring the reactants at 200 rpm while maintaining the temperature at 45° C. for polymerization initiation. After 10 hours, NaCl was added to substitute Cl into a terminal of the polymerized compound to terminate the polymerization reaction, and a monomer not participating in the polymerization reaction was discharged.

After dispersing the polymerized compound in an N-methylpyrrole solvent, acrylic acid was added to the polymerized compound at a molar ratio of 1:1.1 and the mixture was stirred at 200 rpm while maintaining the temperature at 45° C. in the presence of NaOH. Thereafter, after 10 hours, a drying process was performed at 120° C. to obtain an organic binder in which the Cl at the terminal was substituted with an acryloxy group.

Thereafter, an electrode for a lithium secondary battery and a lithium secondary battery were prepared in the same manner as in Example 1 except that the organic binder prepared according to Example 2 was used.

COMPARATIVE EXAMPLE

1. Comparative Example 1

An electrode for a lithium secondary battery and a lithium secondary battery were prepared in the same manner as in Example 1 except that polyvinylidene fluoride (PVDF) was used instead of the organic binder in Example 1.

EXPERIMENTAL EXAMPLES

1. Experimental Example 1

Initial Capacity Measurement

After formation was performed on each of the lithium secondary batteries prepared in Examples 1 and 2 and the lithium secondary battery prepared in Comparative Example 1 at a current of 100 mA (0.1 C rate), when constant current/constant voltage (CC/CV) charging at 334 mA (0.3 C, 0.05 C cut-off) to 4.2 V and CC discharging at 333 mA (0.3 C) to 3 V were repeated 3 times, capacity of the lithium secondary battery measured in a $3^{rd}$ discharged state was selected as initial capacity. The results thereof are presented in Table 1 and FIG. 1.

TABLE 1

|  | Initial capacity (mAh) |
| --- | --- |
| Example 1 | 2.01 |
| Example 2 | 2.00 |
| Comparative Example 1 | 1.96 |

Referring to Table 1, with respect to the lithium secondary batteries of Examples 1 and 2, it was confirmed that initial capacities were relatively higher than that of the lithium secondary battery of Comparative Example 1. This seems to be due to the fact that, with respect to Examples 1 and 2, the more uniform and stable gel polymer electrolyte was formed on the surface of the electrode to reduce interfacial resistance.

2. Experimental Example 2

Room-Temperature Lifetime Evaluation

After formation was performed on each of the lithium secondary batteries prepared in Examples 1 and 2 and the lithium secondary battery prepared in Comparative Example 1 at a current of 100 mA (0.1 C rate), when constant current/constant voltage (CC/CV) charging at 334 mA (0.3 C, 0.05 C cut-off) to 4.2 V and CC discharging at 333 mA (0.3 C) to 3 V were repeated 100 times, capacity of the lithium secondary battery in a 100th discharged state and capacity of the lithium secondary battery, in a state in which first charge was performed at 333 mA (0.3 C, 0.05 C cut-off) to 4.2 V under a CC/CV condition after performing the initial formation, and first discharge was then performed at a CC of 333 mA (0.3 C) to 3 V, were compared to calculate capacity retention. The results thereof are presented in Table 2.

TABLE 2

|  | Capacity retention (%) |
| --- | --- |
| Example 1 | 95 |
| Example 2 | 96 |
| Comparative Example 1 | 92 |

Referring to Table 2, with respect to the lithium secondary batteries of Examples 1 and 2, it was confirmed that capacity retentions were higher than that of the lithium secondary battery of Comparative Example 1. This seems to be due to the fact that, with respect to the lithium secondary batteries according to Examples 1 and 2, the gel polymer electrolyte was uniformly and stably formed on the surface of the electrode to suppress the occurrence of an electrolyte degradation reaction on the surface of the electrode.

3. Experimental Example 3

High-temperature Safety Evaluation

A hot box test (test in which a fully charged lithium secondary battery at a state of charge (SOC) of 100% was left standing for 4 hours at 150° C. (heating rate of 5° C./min) to confirm whether or not ignition occurred), as an evaluation index for the confirmation of high-temperature durability, was performed on each of the lithium secondary batteries prepared in Examples 1 and 2 and Comparative Example 1. The results thereof are presented in Table 3 and FIG. 2 below.

TABLE 3

|  | Whether or not ignition occurred | Ignition start time (minutes) |
| --- | --- | --- |
| Example 1 | x | — |
| Example 2 | o | 180 |
| Comparative Example 1 | o | 10 |

In Table 3, x represents a case where ignition did not occur during storage at 150° C., and O represents a case where the ignition occurred during storage at 150° C.

Figure 2:
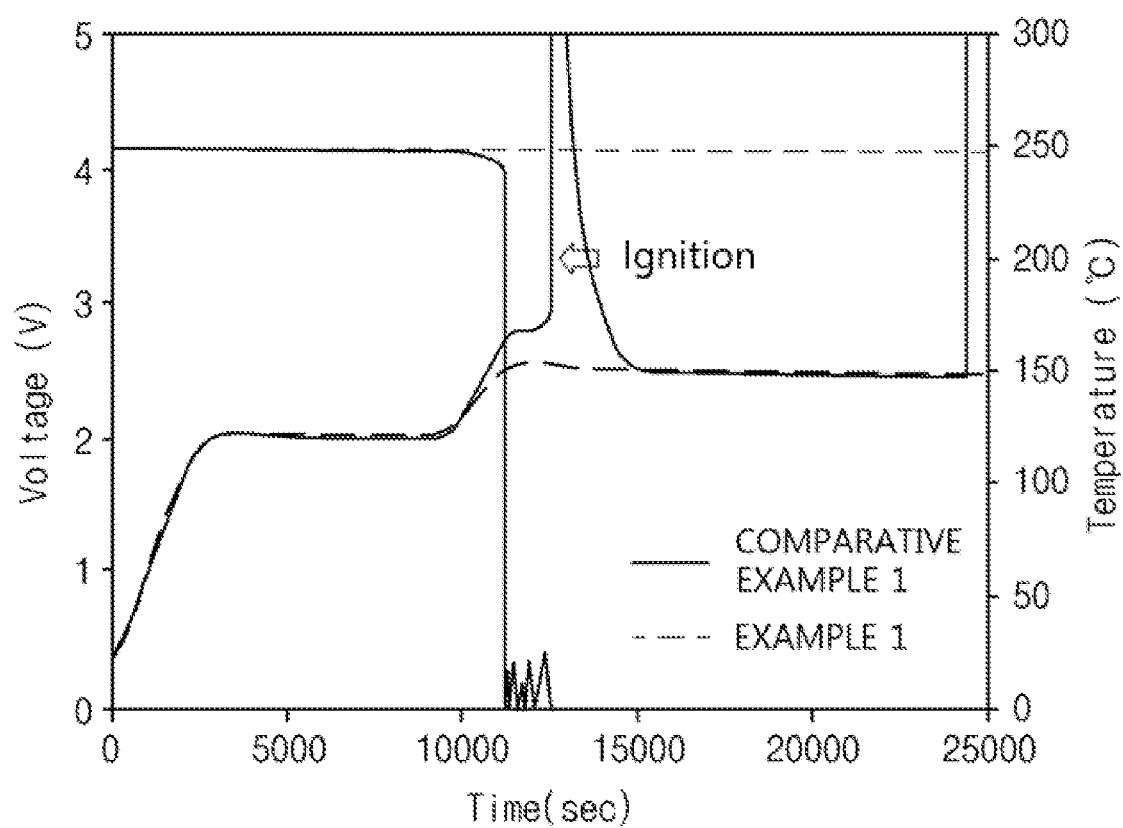
FIG. 2 is a graph illustrating occurrence or non-occurrence of ignition of lithium secondary batteries which are measured according to Experimental Example 3.

Referring to Table 3 and FIG. 2, since the lithium secondary battery of Example 1 has excellent electrode interface stability even during high-temperature storage in a fully charged state, an exothermic reaction and a thermal runaway phenomenon are suppressed, and thus, it may be confirmed that the battery was not ignited. The lithium secondary battery of Example 2 was ignited, but the ignition was delayed for 180 minutes or more, and thus, it may be confirmed that high-temperature safety was relatively better than that of Comparative Example 1 which was ignited within 10 minutes.

The invention claimed is:

1. A lithium secondary battery comprising an electrode and a gel polymer electrolyte,
   wherein the electrode comprises an electrode current collector; and an electrode active material layer which is formed on one surface of the electrode current collector and includes an electrode active material and an organic binder containing an ethylenically unsaturated group and a main chain or a side chain, wherein the ethylenically unsaturated group is substituted into the main chain or the side chain, and the main chain or the side chain comprises a unit containing at least one selected from an alkylene group having 1 to 5 carbon atoms, which is substituted with at least one halogen element, an alkylene oxide group having 1 to 5 carbon atoms, which is substituted with at least one halogen element, an imide group, or celluloid, and
   the gel polymer electrolyte comprises a polymer network having a three-dimensional structure formed by a radical polymerization of an oligomer containing a (meth) acrylate group wherein the oligomer is bonded with the organic binder.

2. The lithium secondary battery of claim 1, wherein the ethylenically unsaturated group comprises at least one selected from a vinyl group, an acryloxy group, or a methacryloxy group.

3. The lithium secondary battery of claim 1, wherein the organic binder is included in an amount of 0.5 part by weight to 20 parts by weight based on 100 parts by weight of the electrode active material layer.

4. The lithium secondary battery of claim 1, wherein the oligomer further comprises an oxyalkylene group.

5. The lithium secondary battery of claim 1, wherein the oligomer is represented by Formula 1:

$$A\text{-}C_1\text{-}A' \qquad \text{[Formula 1]}$$

wherein, in Formula 1,

A and A' are each independently a unit containing at least one (meth)acrylate group, and $C_1$ is a unit containing an oxyalkylene group.

6. The lithium secondary battery of claim 1, wherein the oligomer comprises at least one selected from compounds represented by Formulae 1-1 to 1-5:
[Formula 1-1]
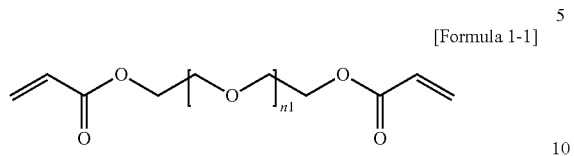
n1 in Formula 1-1 is 1 to 10,000,
[Formula 1-2]
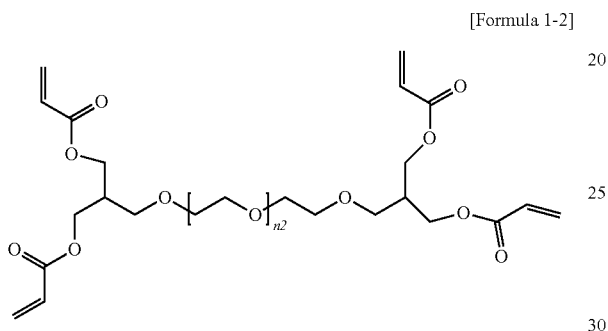
n2 in Formula 1-2 is 1 to 10,000,
[Formula 1-3]
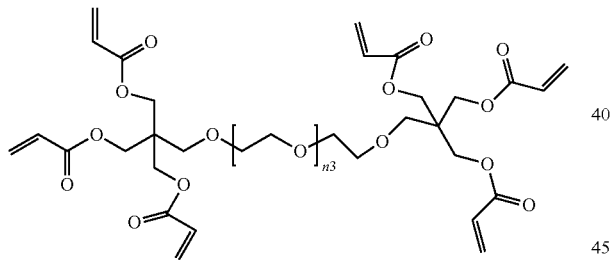
n3 in Formula 1-3 is 1 to 10,000,
[Formula 1-4]
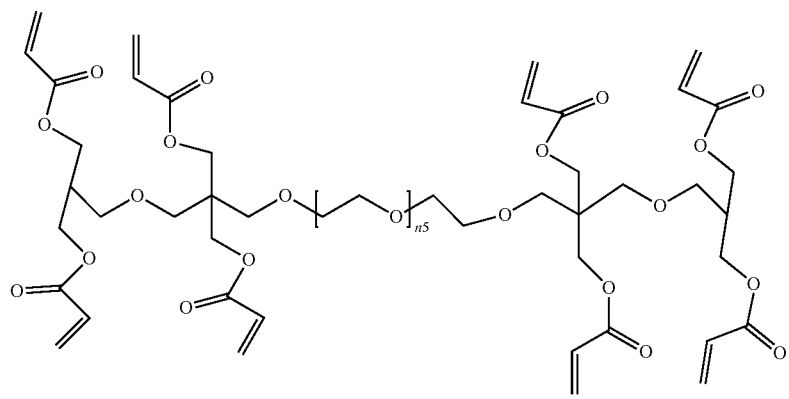

n4 in Formula 1-4 is 1 to 10,000, and

[Formula 1-5]

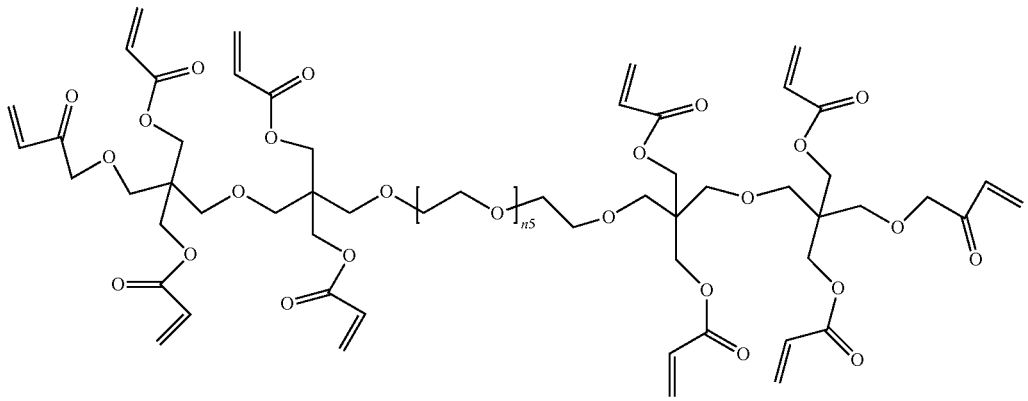

n5 in Formula 1-5 is 1 to 10,000.

7. The lithium secondary battery of claim 1, wherein the gel polymer electrolyte is formed by curing after injecting a composition for a gel polymer electrolyte including the oligomer and a polymerization initiator into a battery case.

8. The lithium secondary battery of claim 1, wherein the electrode is a positive electrode or a negative electrode.

9. The lithium secondary battery of claim 1, wherein the unit contains at least one represented by Formulae X-1, X-2, and X-4 to X-6 below:

[Formula X-1]

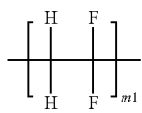

m1 is an integer of 10 to 10,000,

[Formula X-2]

m2 and m3 are each independently an integer of 10 to 10,000,

[Formula X-4]

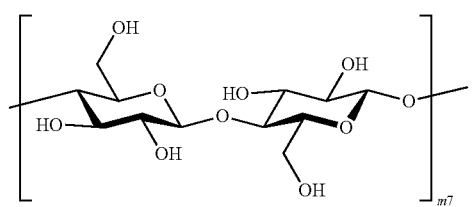

m5 is an integer of 10 to 10,000,

[Formula X-5]

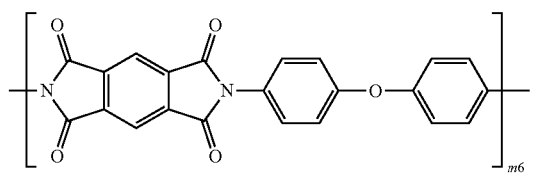

m6 is an integer of 1 to 50,000, and

[Formula X-6]

m7 is an integer of 10 to 10,000.

10. The lithium secondary battery of claim 1, wherein the electrode active material layer further comprises a conductive material and a binder that does not contain an ethylenically unsaturated group.

11. The lithium secondary battery of claim 5, wherein the units A and A' each independently include at least one selected from units represented by Formulae A-1 to A-5 below:

[Formula A-1]

[Formula A-2]
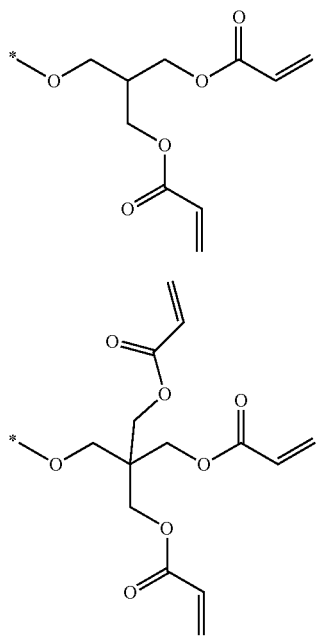
[Formula A-3]
[Formula A-4]
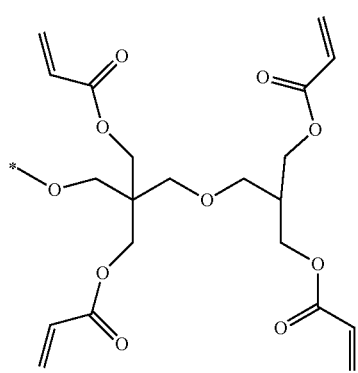
and
[Formula A-5]
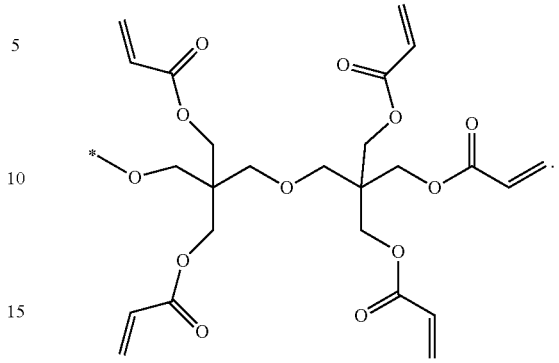
12. The lithium secondary battery of claim 5, wherein the unit $C_1$ includes a unit represented by Formula $C_1$-1 below:
$$*-[R-O]_{k1}-O-*$$ [Formula $C_1$-1]
wherein R is a substituted or unsubstituted linear or branched alkylene group having 1 to 10 carbon atoms, and k1 is an integer of 1 to 10,000.
* * * * *